United States Patent
Miyamoto et al.

[11] Patent Number: 6,131,342
[45] Date of Patent: *Oct. 17, 2000

[54] AUTOMOTIVE DOOR WEATHER STRIP ARRANGEMENT

[75] Inventors: Wataru Miyamoto; Mikio Suzuki, both of Wako; Takashi Miyafuji, Hiroshima, all of Japan

[73] Assignees: Honda Giken Kogyo Kabushiki Kaisha, Tokyo; Nishikawa Rubber Co., LTD, Hiroshima-ken, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/129,596

[22] Filed: Aug. 5, 1998

[30] Foreign Application Priority Data

Aug. 6, 1997 [JP] Japan ................... 9-212035
Aug. 6, 1997 [JP] Japan ................... 9-212036
Aug. 6, 1997 [JP] Japan ................... 9-212037

[51] Int. Cl.$^7$ ............................................ E06B 7/16
[52] U.S. Cl. ................. 49/484.1; 49/498.1; 49/489.1
[58] Field of Search .................... 49/475.1, 489.1, 49/498.1, 495.1, 484.1

[56] References Cited

U.S. PATENT DOCUMENTS

| | | | |
|---|---|---|---|
| 4,653,802 | 3/1987 | Watanabe et al. ................. | 296/203 |
| 5,010,689 | 4/1991 | Vaughan ........................ | 49/489.1 X |
| 5,016,394 | 5/1991 | Iida et al. ..................... | 49/489.1 X |
| 5,346,273 | 9/1994 | Takeuchi ....................... | 296/146.9 |
| 5,347,758 | 9/1994 | Yamane ......................... | 49/484.1 |
| 5,367,830 | 11/1994 | Omura et al. .................. | 49/489.1 X |
| 5,462,292 | 10/1995 | Yamane ......................... | 49/484.1 X |

FOREIGN PATENT DOCUMENTS 5-68750 9/1993 Japan .

*Primary Examiner*—Jerry Redman
*Attorney, Agent, or Firm*—Skjerven Morrill MacPherson LLP; Alan H. MacPherson; David C. Hsia

[57] ABSTRACT

In an automotive door weather strip arrangement, including a primary door weather strip for sealing an inner gap between a door sash of an automotive door and a body panel, and a secondary door weather strip for sealing an outer gap between the door sash and the body panel, a first seal lip extending from the primary door weather strip overlaps a second seal lip extending from an opposing surface of the secondary door weather strip. Thus, a favorable sealing can be achieved by the slidable contact between the first seal lip and the second seal lip. Because the contact pressure between the two seal lips is not affected by the deformation of either one of the door weather strips, a permanent set of the seal lips can be avoided. Because the contact area between the two seal lips extends over an area of a certain size, a highly effective and durable sealing performance can be achieved.

15 Claims, 3 Drawing Sheets

AUTOMOTIVE DOOR WEATHER STRIP ARRANGEMENT

TECHNICAL FIELD

The present invention relates to an automotive door weather strip arrangement which is to be attached to an outer periphery of an automotive door to seal a gap between the door sash and an opposing part of the door panel, and in particular to an automotive door weather strip arrangement including a primary door weather strip for sealing an inner gap between the door sash and the body panel, and a secondary door weather strip for sealing an outer gap between the door sash and the body panel.

BACKGROUND OF THE INVENTION

Door weather strips of this type are known, for instance from U.S. Pat. Nos. 4,653,802 and 5,346,273. They provide a relatively favorable sealing performance because they doubly seal both an inner gap and an outer gap between the door sash and the body panel, but create the need to seal the base portion of the weather strip. In particular, it is necessary to prevent water from being trapped between the primary and secondary door weather strips. It was proposed in Japanese Utility Model Laid-Open Publication No. 5-68750 to abut the primary and secondary door weather strips to each other to keep water from reaching the base portions from the interface between the primary and secondary door weather strips, but after repeated deformation of the weather strips, it becomes difficult to maintain an adequate contact pressure between the primary and secondary door weather strips.

The secondary door weather strip is typically provided with a seal lip which abuts the body panel upon closure of the door as a sealing member for closing the outer gap. However, the seal lip tends to develop creases on the outer surface as a result of a buckling deformation of the seal lip. Such creases tend to trap rainwater therein, and may cause unsightly water drips on the window glass. Also, loss of continuity in the profile of the door sash and the adjacent part of the door panel may lead to aerodynamic disturbances.

BRIEF SUMMARY OF THE INVENTION

In view of such problems of the prior art, a primary object of the present invention is to provide a two-piece automotive door weather strip arrangement which can prevent intrusion of water into the retaining portion or the base portion of the weather strip from the interface between the two parts of the weather strip.

A second object of the present invention is to provide a two-piece automotive door weather strip arrangement which is durable in use, and can maintain the sealing performance of the interface between the two parts of the weather strip over a long service life.

A third object of the present invention is to provide a two-piece automotive door weather strip arrangement which is durable in use, and can maintain a favorable sealing capability to seal the outer gap between the door sash and the opposing body panel.

A fourth object of the present invention is to provide a two-piece automotive door weather strip arrangement which can prevent unsightly dripping of water on the window glass due to the trapping of rainwater in the outer or the secondary weather strip.

A fifth object of the present invention is to provide a two-piece automotive door weather strip arrangement which can favorably accommodate dimensional errors in the door sash and/or the body panel without sacrificing the sealing performance.

According to the present invention, these and other objects can be accomplished by providing an automotive door weather strip arrangement, including a primary door weather strip for sealing an inner gap between a door sash of an automotive door and a body panel, and a secondary door weather strip for sealing an outer gap between the door sash and the body panel, wherein: the primary door weather strip comprises a base portion adapted to be retained by the door sash, a hollow seal portion extending from the base portion for sealing engagement with the body panel, and a first seal lip extending from the base portion toward the secondary door weather strip; and the secondary door weather strip comprises a base portion adapted to be retained by the door sash, a second seal lip overlying with the first seal lip of the primary door weather strip one over the other.

Preferably, the first seal lip of the primary door weather strip is placed over the second seal lip, and the door sash is provided with a recess immediately below the second seal lip to accommodate a bending deformation of the second seal lip under pressure from the first seal lip. Thus, a favorable sealing can be achieved by the slidable contact between the first seal lip and the second seal lip. Because the contact pressure between the two seal lips is not affected by the deformation of either one of the door weather strips, a permanent set of the seal lips can be avoided. Because the contact area between the two seal lips extends over an area of a certain size, a highly effective and durable sealing performance can be achieved. To further enhance the resiliency of the second seal lip, the base portion of the secondary door weather strip may be provided with a hollow internal cavity.

To achieve a continuous surface between the profiles of the door sash and the body panel, the seal portion of the secondary door weather strip may comprise a third seal lip extending from a side of the base portion of the secondary door weather strip facing away from the primary door weather strip. To avoid buckling deformation of the third seal lip, to thereby avoid creases from being produced on the outer surface of the third seal lip, and to accommodate the bending deformation of the third seal lip in a controlled manner as a free end of the third seal lip abuts an opposing end surface of the body panel, an outward facing surface of a base end of the third seal lip may be provided with a groove. Preferably, to produce an aerodynamically favorable outer surface, and to prevent trapping of rainwater in the third seal lip which would cause unsightly dripping of water on the window glass, the third seal lip should be dimensioned and shaped so as to present a substantially smooth outer surface when the third seal lip closes the outer gap between the door sash and the body panel upon closure of the door. To provide a controlled rigidity to the third seal lip, and thereby achieve a controlled bending deformation of the third seal lip, and to increase the durability of the third seal lip, the base portion of the secondary door weather strip may partly consist of a relatively harder material.

According to a preferred embodiment of the present invention, the automotive door weather strip arrangement further comprises an associated window glass weather strip. Preferably, the window glass weather strip comprises a U-shaped base portion, an outer seal lip extending from an outer side wall of the base portion, and a hollow seal portion extending from an inner side wall of the base portion so that an upper end of a window glass may be interposed between the outer seal lip and the hollow seal portion as the upper end of the window glass moves into a cavity defined between the side walls of the base portion of the window glass weather strip, an inner surface of the inner side wall of the base portion being provided with a rounded recess at a base end of the hollow seal portion. The rounded recess allows the hollow seal portion to deform without producing any localized stress so that an adequate contact pressure can be achieved over the entire service life of the weather strip. In particular, it is preferable if a bottom portion of the recess is spaced from a reference line passed between an inner surface of a base end of the inner side wall and a base end of an inner cavity of the hollow seal portion, away from the outer seal lip of the window glass weather strip.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
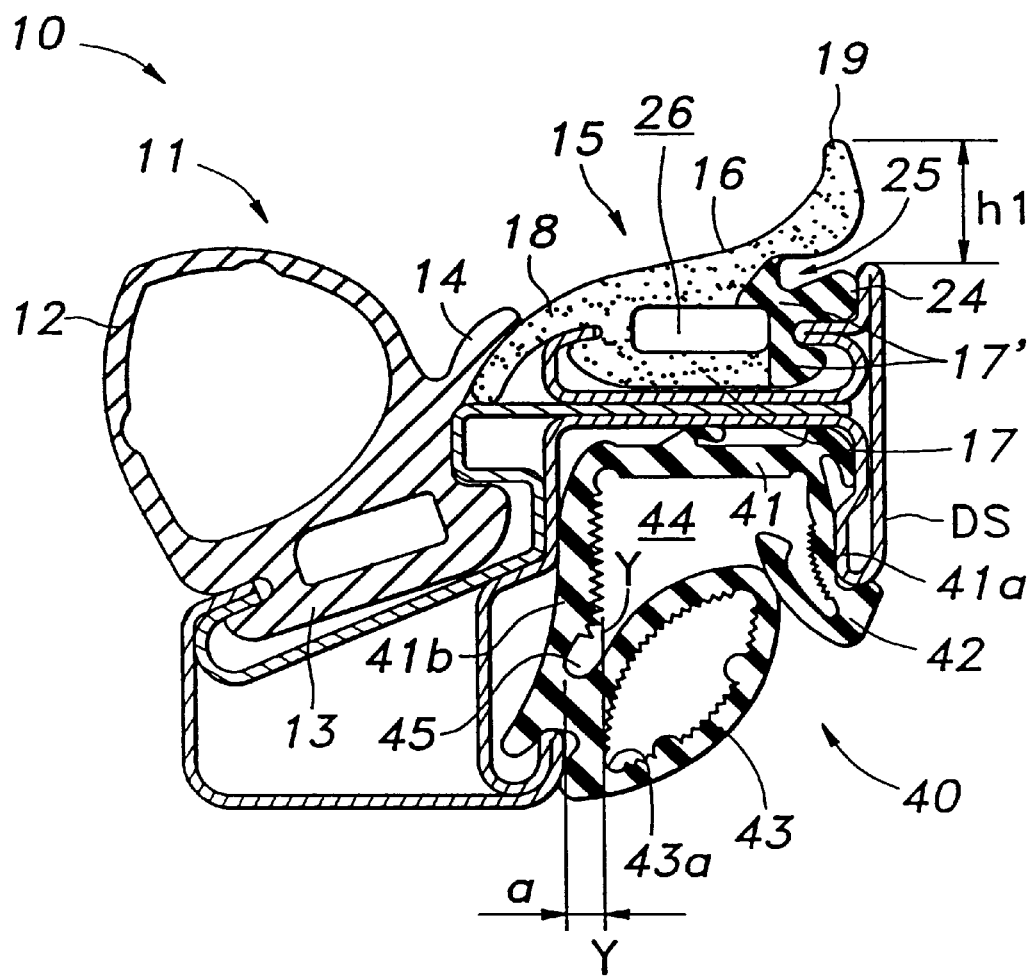
FIG. 1 is a sectional view taken along line I—I of FIG. 3 showing a preferred embodiment of the present invention.
Figure 2:
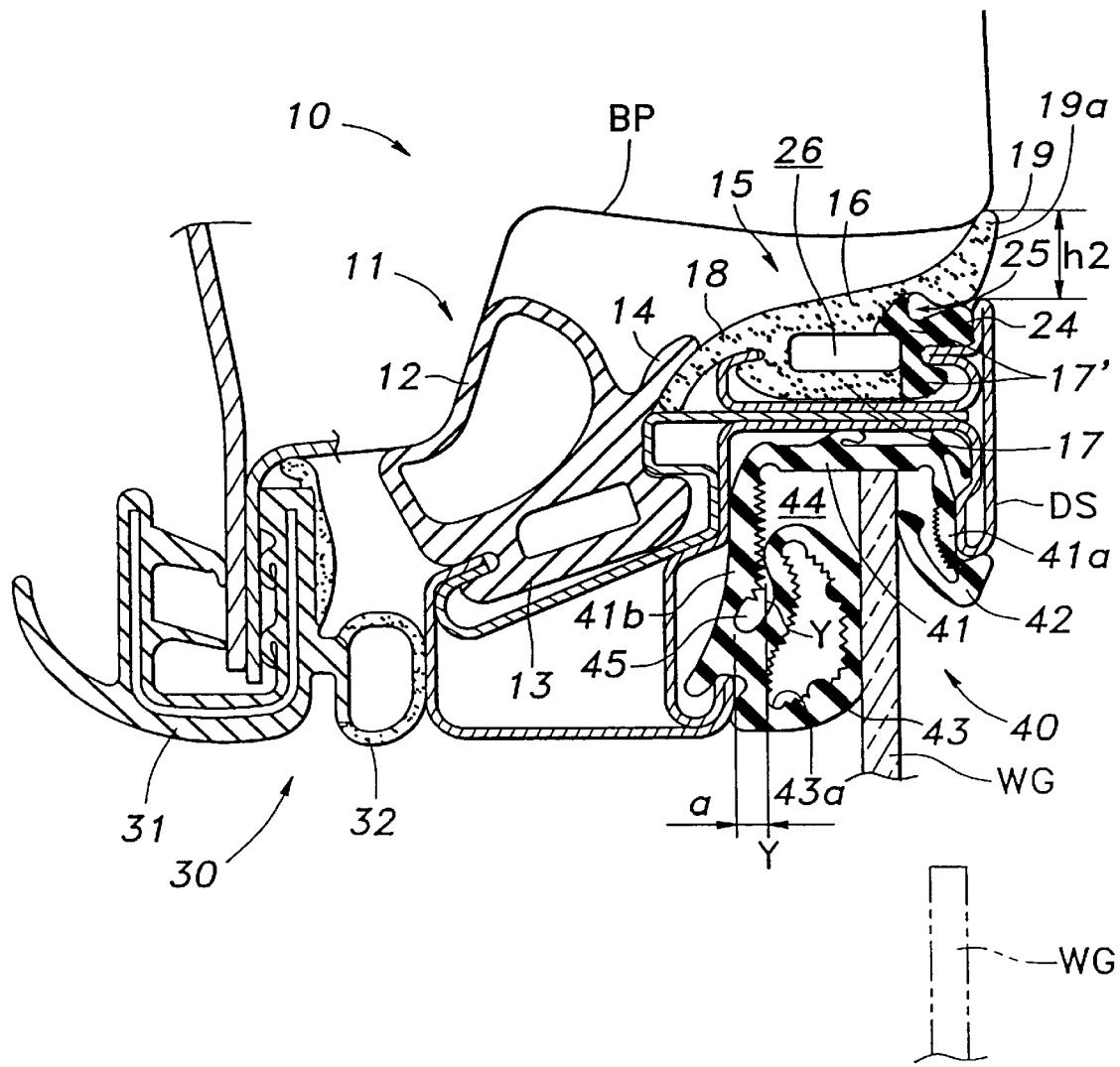
FIG. 2 is a view similar to FIG. 1 showing the state when the door is closed.

FIGS. 1 and 2 show an automotive door weather strip arrangement according to the present invention. This arrangement 10 essentially consists of a door weather strip 11 and 15, and a window glass weather strip 40. The door weather strip consists of a primary door weather strip 11, a more outwardly located secondary door weather strip 15, and a tertiary weather door weather strip 30.

Referring to FIG. 1 showing the arrangement when the door is open, the primary and secondary door weather strips 11 and 15 are placed along a part of the door sash DS generally above the belt line, and are adapted to close the gap between the door sash DS and the surrounding body panel BP (FIG. 2) at inner and outer parts thereof. The primary and secondary door weather strips 11 and 15 consist of separate molded components which are adapted to be manufactured separately and attached to separate retainer portions of the door.

The primary weather door strip 11 comprises a hollow base portion 13 which is fitted into a corresponding recess provided in the door sash DS, a hollow seal portion 12 supported by the base portion 13, and a first seal lip 14 extending integrally from a side of the primary door weather strip 11 facing the secondary door weather strip 15. The base end of the first seal lip 14 is located in a part of the base portion 13 adjacent to the hollow seal portion 12. The recess in the door sash DS serving as a retainer portion is undercut along either side thereof, and is adapted to positively retain the primary weather strip 11 by resiliently retaining complementary projections provided in the base portion 13 of the primary door weather strip 11.

The secondary door weather strip 15 comprises a hollow base portion 17 which is similarly retained by a corresponding retainer portion provided in the door sash DS, a second seal lip 18 extending from an upper part of the hollow base portion 17 toward the primary weather door strip 11, and a third seal lip 19 extending from an upper part of the hollow base portion 17 away from the primary weather door strip 11. The base portion 17, the second seal lip 18, and the third seal lip 19 jointly define a continuous outer surface 16 which faces away from the door sash DS. The first seal lip 14 and the second seal lip 18 overlay each other, preferably maintaining a resilient contact pressure therebetween. In this embodiment, the first seal lip 14 is placed over the second seal lip 18, but a reversed relationship is also possible without departing from the basic inventive concept of the present invention. The secondary door weather strip 15 is further provided with a projection 24 which extends laterally from a side of the base portion 17 immediately below the third seal lip 19, and rests upon a corresponding shoulder defined in the door sash DS. The projection 24 extends substantially over the entire length of the secondary door weather strip 15, and defines a groove 25 in cooperation with the third seal lip 19.

In such a two-piece weather strip, it is essential to keep moisture such as rainwater from reaching the door sash DS from the boundary between the primary and secondary door weather strips. In particular, the primary door weather strip 11 is subjected to an outwardly pressure every time the door is closed. Therefore, if the primary and secondary door weather strips simply abut each other by their opposing ends, it is difficult to maintain an adequate contact pressure between them. On the other hand, according to the illustrated embodiment, the movement of the first seal lip 14 which may be caused by the pressure on the seal portion 12 from the body panel BP as the door is closed is typically at a certain angle relative to the direction of the contact pressure between the first and second seal lips 14 and 18, and, therefore, would not substantially affect the contact pressure.

Even when the deformation of the primary door weather strip 11 resulting from the closure of the door is such that the first seal lip 14 is pressed onto the second seal lip 18, the second seal lip 18, having a small thickness, can readily accommodate such a deformation without incurring any substantial permanent set. The door sash DS is provided with a recess which accommodates such a bending deformation of the second seal lip 18. Also, the contact region between the first seal lip 14 and the second seal lip 18 extends over a certain surface area, and moves along the length of each seal lip so that the localized wear of the contact region can be avoided.

The outer surface of the second seal lip 18 preferably consists of either a somewhat inclined planar surface or a convex surface so that a favorable contact may be established with the inner surface of the first seal lip 14. Also, to achieve a favorable deformation of the second seal lip 18 and avoid a stress concentration in the second seal lip 18, the base portion 17 of the secondary door weather strip 15 may be provided with a cavity 26 for an added resiliency of the base portion 17. All these factors contribute to the achievement of a favorable and durable sealing effect between the primary door weather strip 11 and the secondary door weather strip 15.

Figure 3:
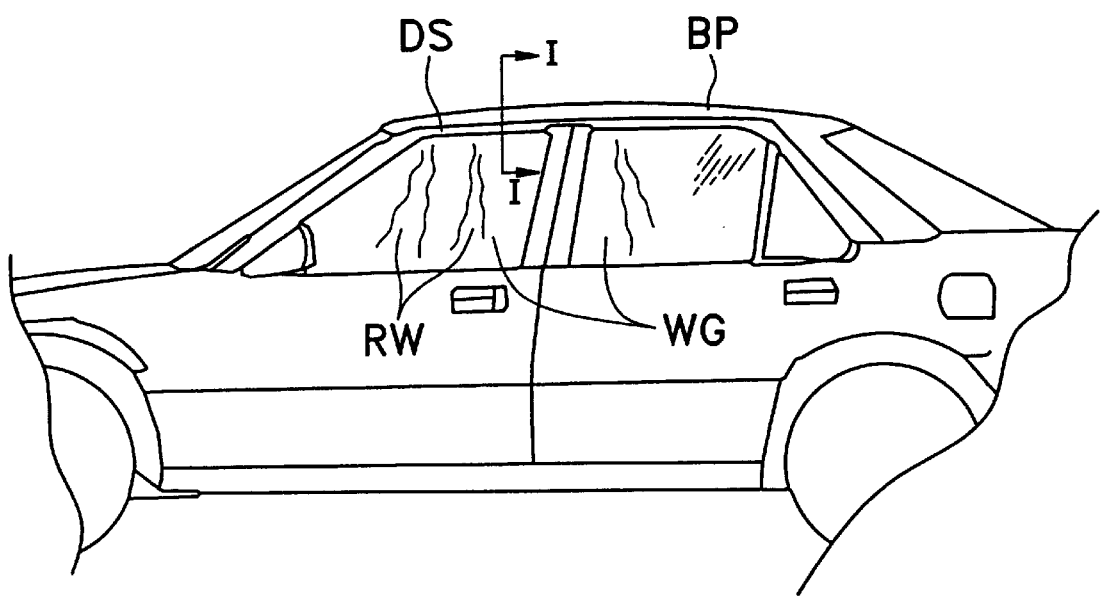
FIG. 3 is a side view of an automobile to which the present invention is applied.

The third seal lip 19 extends outwardly and away from the door sash DS in an oblique direction. The height $h_1$ of the third seal lip 19 from an edge of the door sash DS is somewhat larger than the gap $h_2$ between the edge of the door sash DS and the opposing end of the body panel BP when the door is fully closed. Therefore, when the door is closed, the third seal lip 19 abuts the body panel BP, and deflects as illustrated in FIG. 2. Owing to the provision of the groove 25, the third seal lip 19 is allowed to undergo a significant amount of deflection without the third seal lip 19 buckling under the force applied to the tip of the third seal lip 19 from the body panel BP. In other words, the outer surface 19a of the third seal lip 19 presents a relatively smooth surface which substantially connects the profile of the body panel BS to that of the door sash DS without any sudden break. If were not for the groove 25 for accommodating the deflection of the third seal lip 19, creases would have developed on the outer surface 19a of the third seal lip 19 when the door is closed. Such creases would trap rainwater therein, and causes unsightly water drips RW (FIG. 3) on the window glass.

Additionally, the provision of the groove 25 increases the tolerance in the size of the gap and the misalignment between the door sash DS and the opposing part of the door panel BP. The flexibility of the third seal lip 19 is enhanced by the groove 25, and increases the capability of the third seal lip 19 to repeatedly deform without losing its resiliency or without incurring a permanent set in the third seal lip 19. Therefore, the provision of the groove 25 also increases and prolongs the sealing capability of the door weather strip. In other words, the door weather strip according to the present invention can be used over an extended period of time without suffering from any changes in the resilient reaction to the closure of the door, and the speed of door closure while maintaining a required sealing capability.

In such weather strips, it is often preferable to use materials of different properties such as hardness in different parts of its cross section. For instance, in this case, to ensure the mechanical stability of the secondary door weather strip 15 and provide a controlled rigidity to the third seal lip 19, an outer part 17' of the base portion 17 of the secondary door weather strip 15 may consist of a relatively hard rubber-like material such as ethylene-propylene solid rubber material.

Referring to FIG. 2, this door weather strip arrangement further includes a tertiary door weather strip 30 attached to a flange of a part of the body panel BP at an innermost part of the gap between the door and the body panel. In this case, the tertiary door weather strip 30 includes an inner trim 31 attached to the flange part of the body panel BP, and a hollow seal portion 32 extending from the inner trim 31 and adapted to abut a part of the door when the door is fully closed.

The window glass weather strip 40 comprises a U-shaped base portion 41 which is retained in a corresponding retainer portion provided in the door sash DS, an outer seal lip 42 which extends from an outer side wall 41a of the base portion 41 and curves inward so as to abut the outer surface of the window glass WG with an outer convex surface of the outer seal lip 42, and a hollow seal portion 43 which extends from an inner side wall 41b of the base portion 41 and likewise curves outward so as to abut the inner surface of the window glass WG with an outer convex surface of the hollow seal portion 43. The window glass weather strip 40 in this case consists of a one-piece molded member consisting of such material as ethylene-propylene solid rubber. The base ends of the outer seal lip 42 and the hollow seal portion 43 are provided with slots which receive corresponding projections of the door sash DS to ensure secure resilient retention of the window glass weather strip 40 to the door sash DS. Thus, as the window glass WG is fully closed, the upper end of the window glass is sealingly interposed between the outer seal lip 42 and the hollow seal portion 43, and advances into an inner cavity 44 jointly defined by the base portion 41, the outer seal lip 42 and the hollow seal portion 43 while the outer seal lip 42 and the hollow seal portion 43 curve toward the window glass WG.

The surface of the base end of the hollow seal portion 43 facing the inner cavity 44 is provided with a recess 45 which smoothly connects the adjacent outer profiles of the base portion 41 and the hollow seal portion 43. This is advantageous in view of eliminating any localized stress which may impair the durability of the window glass weather strip 40, and/or may be detrimental to long-term sealing performance by causing a permanent set. In particular, when a reference line Y—Y is drawn between the base end 43a of the inner cavity of the hollow seal portion 43 and the inner surface of the corresponding side wall 41b of the base portion 41, the bottom of the recess 45 is offset from this reference line Y—Y by a distance a on the other side of the window glass WG. Preferably, this distance is 0.2 mm to 1.0 mm for a normal passenger vehicle, but may vary depending on the make of the vehicle and the size of the door sash DS. When this distance is less than 0.2 mm, a premature compressive permanent set may occur, thereby causing the contact pressure between the hollow seal portion 43 and the window glass WG to be lost, and the required sealing performance to be lost in a relatively short time. When this distance is more than 1.0 mm, it becomes difficult to ensure a sufficient thickness to the side wall of the base portion 41, and an adequate contact pressure between the hollow seal portion 43 and the window glass WG may not be achieved from the beginning.

Also, the minimum radius of curvature at the joint between the base end of the hollow seal portion 43 and the recess 45 is desired to be as large as possible for the given space, and may be in the range of 0.5 mm to 1.0 mm. When this radius of curvature is less than 0.5 mm, a premature compressive permanent set may occur, thereby causing the contact pressure between the hollow seal portion 43 and the window glass WG to be lost, and the required sealing performance to be lost in a relatively short time. When this radius of curvature is more than 1.0 mm, it becomes difficult to ensure a sufficient thickness to the side wall of the base portion 41, and an adequate contact pressure between the hollow seal portion 43 and the window glass WG may not be achieved from the beginning.

When the window glass WG consists of a curved glass sheet, the upper end of the window glass WG moves inwards by a substantial distance, for instance by 3 mm. According to the present invention, owing to the provision of the recess 45 at the base end of the hollow seal portion 43, the hollow seal portion 43 is allowed to deflect without involving any localized stress while maintaining an adequate contact pressure over a large surface area of the window glass WG. This ensures a sufficient sealing performance without producing any substantial permanent set over an extended time period. Also, the outer seal lip 42 is capable of maintaining a favorable sealing performance, and accommodating any inward or outward offset of the window glass WG. As will be readily appreciated by a person skilled in the art, the window glass weather strip 40 of the present invention can also favorably accommodate any positional errors in the window glass WG with respect to the window glass weather strip 40.

Although the present invention has been described in terms of preferred embodiments thereof, it is obvious to a person skilled in the art that various alterations and modifications are possible without departing from the scope of the present invention which is set forth in the appended claims.

What is claimed is:

1. An automotive door weather strip arrangement, comprising:
   a door sash of an automotive door including:
      a first recess having a first pair of grooves, and
      a second recess having a second pair of grooves, said second recess being separated from said first recess by a middle region;

a primary door weather strip for sealing an inner gap between said door sash and a body panel, said primary door weather strip comprising a first base portion having a first pair of flanges mating with said first pair of grooves to retain said first base portion within said first recess of said door sash, a first hollow seal portion extending from said first base portion for sealing engagement with said body panel, and a first seal lip extending from said first base portion into said middle region; and a secondary door weather strip for sealing an outer gap between said door sash and said body panel, said secondary door weather strip comprising a second base portion having a second pair of flanges mating with said second pair of grooves to retain said second base portion within said second recess of said door sash, and a second seal lip extending from an upper portion of said second base portion into said middle region, said second seal lip being in overlapping contact with said first seal lip.

2. An automotive door weather strip arrangement according to claim 1, wherein said first seal lip is placed over said second seal lip, and said door sash is provided with a recess immediately below said second seal lip to accommodate a bending deformation of said second seal lip under pressure from said first seal lip.

3. An automotive door weather strip arrangement according to claim 1, wherein said second base portion provided with a hollow internal cavity.

4. An automotive door weather strip arrangement according to claim 1, wherein said secondary door weather strip comprises a third seal lip extending from a side of said second base portion facing away from said primary door weather strip, and an outward facing surface of a base end of said third seal lip is provided with a groove to accommodate a bending deformation of said third seal lip as a free end of said third seal lip abuts an opposing end surface of said body panel.

5. An automotive door weather strip arrangement according to claim 4, wherein said third seal lip is dimensioned and shaped so as to present a substantially smooth outer surface when said third seal lip closes said outer gap between said door sash and said body panel upon closure of said door.

6. An automotive door weather strip arrangement according to claim 4, wherein said second base portion comprises partly of a harder material so as to provide a controlled rigidity to said third seal lip.

7. An automotive door weather strip arrangement according to claim 1, further comprising a window glass weather strip, said window glass weather strip comprising a U-shaped third base portion, an outer seal lip extending from an outer side wall of said third base portion, and a second hollow seal portion extending from an inner side wall of said third base portion so that an upper end of a window glass is interposed between said outer seal lip and said second hollow seal portion as said upper end of said window glass moves into a cavity defined between said side walls of said third base portion, an inner surface of said inner side wall of said third base portion being provided with a rounded recess at a base end of said second hollow seal portion.

8. An automotive door weather strip arrangement according to claim 7, wherein a bottom portion of said recess is spaced from a reference line passing between an inner surface of a base end of said inner side wall and a base end of an inner cavity of said second hollow seal portion, away from said outer seal lip of said window glass weather strip.

9. An automotive door weather strip arrangement, comprising:

a primary door weather strip for sealing an inner gap between a door sash of an automotive door and a body panel, said primary door weather strip comprising a first base portion retained within a first recess of said door sash, a first hollow seal portion extending from said first base portion for sealing engagement with said body panel, and a first seal lip extending from said first base portion; and a secondary door weather strip for sealing an outer gap between the door sash and the body panel, said secondary door weather strip comprising a second base portion retained within a second recess of said door sash, and a second seal lip extending from an upper portion of said second base portion toward said primary door weather strip, said first seal lip extending toward said secondary door weather strip and in overlapping contact with said second seal lip, wherein said second base portion is provided with a hollow internal cavity.

10. The automotive door weather strip arrangement according to claim 9, wherein said first seal lip is placed over said second seal lip, and said door sash is provided with a recess immediately below said second seal lip to accommodate a bending deformation of said second seal lip under pressure from said first seal lip.

11. An automotive door weather strip arrangement according to claim 9, wherein said secondary door weather strip comprises a third seal lip extending from a side of said second base portion facing away from said primary door weather strip, and an outward facing surface of a base end of said third seal lip is provided with a groove to accommodate a bending deformation of said third seal lip as a free end of said third seal lip abuts an opposing end surface of said body panel.

12. An automotive door weather strip arrangement according to claim 11, wherein said third seal lip is dimensioned and shaped so as to prevent a substantially smooth outer surface when said third seal lip closes said outer gap between said door sash and said body panel upon closure of said door.

13. An automotive door weather strip arrangement according to claim 11, wherein said second base portion comprises partly of a harder material so as to provide a controlled rigidity to said third seal lip.

14. An automotive door weather strip arrangement according to claim 9, further comprising a window glass weather strip, said window glass weather strip comprising a U-shaped third base portion, an outer seal lip extending from an outer side wall of said third base portion, and a second hollow seal portion extending from an inner side wall of said third base portion so that an upper end of a window glass is interposed between said outer seal lip and said second hollow seal portion as said upper end of said window glass moves into a cavity defined between said side walls of said third base portion, an inner surface of said inner side wall of said third base portion being provided with a rounded recess at a base end of said second hollow seal portion.

15. An automotive door weather strip arrangement according to claim 14, wherein a bottom portion of said recess is spaced from a reference line passing between an inner surface of a base end of said inner side wall and a base end of an inner cavity of said second hollow seal portion, away from said outer seal lip of said window glass weather strip.

* * * * *